3,155,568
STABILIZED INSECTICIDE FORMULATIONS
John M. Surgant, Richmond Heights, and Robert A. Conkin, Kirkwood, Mo., assignors to Monsanto Company, a corporation of Delaware
No Drawing. Filed Feb. 23, 1960, Ser. No. 10,076
7 Claims. (Cl. 167—22)

This invention relates to new insecticide formulations and to methods of improving old insecticidal compounds,. More specifically this invention is directed to methods of stabilizing insecticides known to be subject to chemical breakdown in shipping and during storage. Of particular importance is the use of a new expedient in combination with any of the unstable organophosphorus compounds commercially sold and widely used in the control of insects. This instability in storage is a serious problem, making it difficult to prepare formulations which will maintain their optimum effect. Furthermore, the instability makes it necessary to use heavier or repeated applications in order to control the insect population during the critical period of the plant life.

One purpose of this invention is to increase the active life of insect toxicants and to provide a means of more effective insect control. A further purpose is to provide for prolonged activity of the insecticide during storage and to enable a uniform reproducible control of harmful insects. A further purpose is to provide a means of preparing efficient and economical insecticidal formulations.

Commercial insecticides which may be improved by the use of these novel formulations are the thiophosphates, such as:

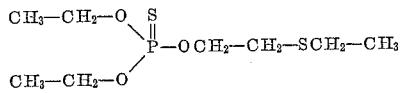

O,O-diethyl O-2-(ethylthio)-ethyl phosphorothioate
(parathion)

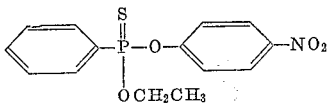

O-ethyl O-p-nitrophenyl phenyl phosphonothioate

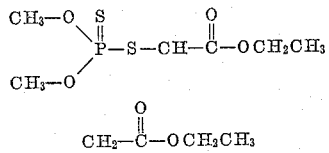

S-[1,2-bis(ethoxycarbonylethyl)]-O,O-dimethyl
phosphorodithioate

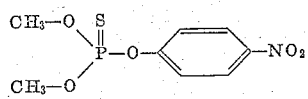

O,O-dimethyl O-p-nitrophenyl phosphorothioate (methyl parathion)

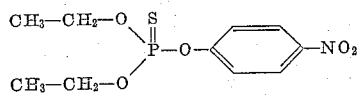

O,O-diethyl O-p-nitrophenyl phosphorothioate

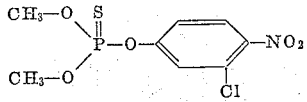

O-(3-chloro-4-nitrophenyl) O,O-dimethyl phosphorothioate

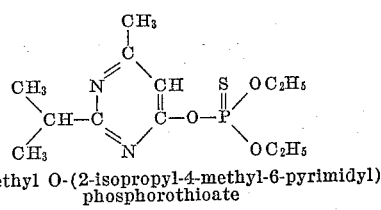

O,O-diethyl O-(2-isopropyl-4-methyl-6-pyrimidyl)
phosphorothioate

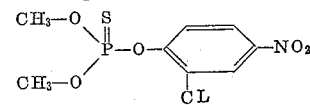

O-(2-chloro-4-nitrophenyl)-O,O-dimethyl phosphorothioate

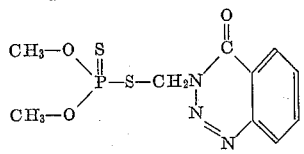

O-O-dimethyl S-(4-oxo-1,2,3-benzotriazinyl-3-methyl)
phosphorodithioate

It is evident that other compounds homologous with the above commercial insecticides will have insecticidal activity and will probably have the instability characteristic of thiophosphate esters.

It has been found that phosphorus thioesters can deteriorate in several weeks to as low as 50% of their original activity. However, they can be stabilized against decomposition by incorporating (1) a compound of the structure:

$$R—X—R' \quad (A)$$

wherein X is an atom of the group consisting of sulfur and oxygen, wherein R is a radical selected from the group consisting of alkyl radicals having 4 to 18 carbon atoms, cycloalkyl radicals having 4 to 8 carbon atoms and oxaalkyl radicals having the sum of the oxygen and carbon atoms from 4 to 18 carbon atoms and wherein R' is a radical selected from the group consisting of hydrogen, the cycloalkyl radicals having from 4 to 8 carbon atoms, the alkyl radicals having from 1 to 18 carbon atoms; and (2) an ester of a sulfur acid having the structure:

$$R''—Y—R''' \quad (B)$$

wherein Y is a radical of the group consisting of

wherein R''' is an alkyl radical having up to 18 carbon atoms; and wherein R'' is selected from the group consisting of hydrogen, alkyl radicals having up to 18 carbon atoms, phenyl and alkyl phenyl wherein the alkyl radical has up to 12 carbon atoms.

Suitable compounds of type (A) include:

Isooctyl alcohol
Dodecyl alcohol
Tetradecyl alcohol
Dimethyl ether of triethylene glycol
Diisodecyl ether
Decyl mercaptan
t-Butyl alcohol condensed with ethylene oxide
Dodecyl n-butyl ether
Methyl n-octyl ether
Ditetradecyl sulfide
Octadecyl alcohol
Pentyl alcohol
Methyl Cellosolve
Dihexadecyl alcohol Octadecylbutyl sulfide
Hexadecyl mercaptan
Cyclohexanol
Cyclopentanol
Dicyclohexyl ether Suitable compounds of type (B) include:

Diethyl sulfite
Dimethyl sulfate
n-Octyl methyl sulfate
Dodecyl hydrogen sulfite
Isodecyl acid sulfate
Diisodecyl sulfite
Diisobutyl sulfate
Methyl p-toluene sulfonate
Octadecyl ethyl sulfate
Octyl benzene sulfonate
Tetradecyl hydrogen sulfite
Tetradecyl n-butyl sulfate
Diisononyl sulfate
Ethyl dodecylbenzene-sulfonate
p-Decyl phenyl butyl sulfate Stabilization can be accomplished by using from 1% to 100% by weight of (A) and from 0.5% to 50% by weight of (B). Optimum results will be obtained by the addition of 5% to 25% by weight of (A) and from 2% to 10% by weight of compound (B). These percentages being based on the thiophosphate component.

Preferred compounds of type (A) are the alkyl alcohols or dialkyl ethers wherein the alkyl groups have 4 to 18 carbon atoms, cyclohexanol and dicyclohexyl ether. Type (B) compounds which are dialkyl sulfates or sulfites having up to 14 carbon atoms are preferred in the practice of this invention. Optimum results are accomplished by the use of alcohols of 8 to 14 carbon atoms and the lower molecular weight sulfates having alkyl radicals up to three carbon atoms.

Further compounds of both (A) and (B) types and experimental proof of the stability of the thiophosphate ester insecticides formulated with said compounds are set forth in specific examples.

This invention may be practiced by the addition of at least one of each of the two types of substances described above as (A) or (B) to the thiophosphate esters, either chemically pure or technical grade. The insecticides so formulated will retain their original activity for a substantial period of time and over a long period of time will lose only a relatively small portion of the said activity.

Of particular importance is the stabilization of the thiophosphate insecticides after they are formulated for use, especially as pulverulent compositions known as "dusts." Prior to formulation, the technical or chemically pure materials are stored under conditions which tend to minimize decomposition. It has been found that when the insecticides are shipped to mills where they are formulated into pulverulent solid compositions, and especially when shipped into the areas where they are customarily used, often in tropical climates, the decomposition is accelerated. It is not uncommon for the formulated solid compositions to be subjected to temperatures of as high as 100 to 120° F. when the compositions are stored in buildings with the roofs exposed to direct sunlight.

The solid diluents are made by milling or otherwise mixing the compositions with finely divided solid materials. Suitable solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 45% to 97% by weight, of the entire formulation. More concentrated formulation will require dilution by the user for the most effective usage.

*Example I*

Samples of insecticidal dusts containing 20% methyl parathion on an attapulgus clay carrier were stored at temperatures of 122° F. for six week periods. At the end of this aging test, the samples were assayed to determine the percentage of original active component remaining. The following table shows the observations at the end of the test period for certain alcohols and diethyl sulfate separately and in combinations used, the percentages being based on the methyl parathion.

| Alcohol (25%) | Ester (5%) | Percent Remaining Active Component |
|---|---|---|
| None | None | 86 |
| Isodecyl alcohol | do | 80 |
| Decyl alcohol | do | 78 |
| Dodecyl alcohol | do | 81 |
| None | Diethyl sulfate | 62 |
| Lauryl alcohol | do | 96 |
| Isodecyl alcohol | do | 93 |

*Example II*

To demonstrate possible variation in the ester additional experiments were conducted with isodecyl alcohol as the alcohol component.

| Alcohol (25%) | Ester of oxygen—Sulfur acid (5%) | Percent Remaining Active Component |
|---|---|---|
| Isodecyl alcohol | Isodecyl sulfite | 95 |
| Do | Didecyl sulfite | 94 |
| Do | Didecyl sulfate | 95 |
| Do | Isodecyl sulfuric acid | 92 |
| Do | Dimethyl sulfate | 93 |
| Do | Decyl sulfuric acid | 93 |
| Do | Diethyl sulfate | 98 |

*Example III*

To demonstrate possible variation in the alcohol or ether component, additional experiments were conducted with the ester unchanged.

| Ether, Alcohol, mercaptan (25%) | Ester of oxygen containing Sulfur acid (5%) | Percent Remaining Active Component |
|---|---|---|
| Didecyl ether | Diethyl sulfate | 92 |
| Isodecyl alcohol | do | 98 |
| Lorol Alcohol | do | 96 |
| Dodecyl alcohol | do | 93 |
| Tetradecyl alcohol | do | 93 |
| t-Dodecyl mercaptan | do | 90 |
| Dimethyl ether of triethylene glycol | do | 96 |

The percentages of the two stabilizer components are in percent by weight based on the methyl parathion. Thus the percentages are the same for both field use formulations and concentrates.

*Example IV*

Parathion (O,O-diethyl O-p-nitrophenyl phosphorothioate) was formulated with attapulgous clay so as to provide 20% by weight of parathion in the product. The formulation was aged for 55 days at 50° C. and assayed periodically to determine the loss of activity. The following data were observed.

| Days: | Percent loss |
|---|---|
| 0 | 0 |
| 7 | 2 |
| 22 | 1 |
| 33 | 10 |
| 55 | 15 |

The above experiment was duplicated except that 2 percent of isodecyl alcohol and 1 percent of diethyl sulfate were added to the formulation. The following was observed on aging at 50° C.

| Days: | Percent loss |
|---|---|
| 0 | 0 |
| 7 | 0 |
| 22 | 0 |
| 33 | 1 |
| 55 | 0 |

*Example V*

A formulation containing 71.4 percent parathion, 7.5 percent isodecyl alcohol, 3 percent diethyl sulfate and 18.1 percent xylene was milled with sufficient attapulgous clay to provide 20% active component (parathion). Upon aging at 50° C. the following was observed.

| Days: | Percent loss |
|---|---|
| 0 | 0 |
| 7 | 0 |
| 22 | 0 |
| 45 | 0 |
| 55 | 0 |

*Example VI*

A formulation of 20% by weight of S-[1,2-bis(ethoxycarbonylethyl)]-O,O-dimethyl phosphorodithioate in attapulgous clay mixture was aged at 50° C. The following assays were determined after specific periods of lapsed time.

| Days: | Percent loss |
|---|---|
| 0 | 0 |
| 12 | 16 |
| 27 | 28.5 |
| 36 | 40 |
| 49 | 41 |

This experiment was repeated using a formulation of 20% active, the same dithioate, 5% isodecyl alcohol and 1% diethyl sulfate.

| Days: | Percent loss |
|---|---|
| 0 | 0 |
| 49 | 4 |

The thiophosphate esters are in some instances solids or liquids of relatively high solidification temperature. Under these circumstances they may be difficult or impossible to formulate by the usual procedure. A commercially desirable and easily used composition can be prepared by dissolving in a suitable solvent. For this purpose hydrocarbon, and particularly aromatic hydrocarbon can be used. For optimum results xylene is the preferred solvent.

Useful alternative formulations are those known as "wettable powders," and which are subject also to deterioration at elevated temperatures. These are generally more concentrated with respect to the insect active phosphorothioate esters and are used as water dispersions for spraying foliage or other surfaces to be treated for control of insects. These compositions may comprise from five to sixty parts of the phosphorothioate ester, from 40 to 95 parts of the solid diluent, and from 0.1 to 20 parts of suitable dispersing agents, emulsifying agents or suspension stabilizers, which are otherwise known as surface active agents.

Suitable surface active agents are well known to those skilled in the art and are widely used in industry to stabilize suspensions, dispersions and emulsions. They may be cationic, anionic or nonionic. These agents usually function through inherent molecular groupings of the compounds, some of which groups are attracted to the aqueous phase and other molecular groupings of the same compounds are adsorbed on the solid diluent and/or the insect active component.

The cationic surface active agents may be quaternary ammonium compounds, such as tetramethyl ammonium chloride and the amine salts, such as octadecyl amine hydrochloride. The essential characteristic of this type of emulsifier is that which is capable of ionization to a negatively charged halogen ion and a positively charged hydrophobic ion. Phosphonium salts and sulfonium salts are also useful. Although a wide variety of cationic emulsifying agents are known, they are in general less important than other types of emulsifying agents.

The non-ionic surface active agents include the molecules wherein the hydrophobic portion and the hydrophilic portion are separated by ether linkages. These include the various ethylene oxide or propylene oxide condensates with fatty alcohols, such as oleyl alcohol to which six moles of ethylene oxide has been added, or the alkyl phenols condensed with ethylene or propylene oxide, such as p-nonyl phenol condensed with eight moles of ethylene oxide. The non-ionic emulsifiers may also contain ester groups separating the hydrophobic and hydrophilic radicals of the compound, for example glycerol mono-stearate and the mono-oleate of propylene glycol. The non-ionic emulsifiers may also contain amide groups, such as lauryl diethanolamide.

The most significant class of surface active agents are the anionic types, which include the common soaps, such as sodium stearate, sodium palmitate, and rosin soaps. Other types are the sulfated oils, such as the sulfated ester of ricinoleic acid. The sulfate may be based on the alcohols, such as the sodium salt of polyoxyethylene sulfate and sodium alkyl polyoxyethylene sulfate. Other types of anionic emulsifiers are the alkyl methyl sulfonate of aliphatic hydrocarbons, such as the sodium salt of isothionic acid and the sulfonates of alkyl aromatic hydrocarbons, such as the sodium salt of sulfonated tetradecyl benzene.

With the addition of the conventional quantities of the above described dispersing agents the solid formulations will become wettable and capable of being diluted with water in any amount to prepare a homogeneous liquid spray composition having the desired amount of insect-active component as may be required for the contemplated use. Useful "wettable dusts" may contain from 5 to 50% by weight, and preferably from 10 to 35%, of the thiophosphate esters, and from 40 to 90%, and preferably from 60 to 85% of the solid diluent or carrier. The alcohol or ether component of the stabilizer may be present in the amount of 0.1 to 10% by weight, but preferred compounds contain from .2 to 5%. The sulfur acid ester component contains from 0.1 to 5% by weight but preferably .2 to 2.0% of the said esters. A surface active agent is required to suspend the formulation in water and the selection will depend upon the quantity of solids present, the solubility of the thiophosphates in the stabilizer compositions or in water, but will generally be from 0.1 to 20% by weight and preferably 0.2 to 10% and so selected as to produce a uniform mixture both before and after dilution in water.

Dusts for direct application to insects and insect environments will generally be higher in solid diluents or carriers, and lower in the toxicants than the "wettable dusts," for example, 2 to 40% and preferably from 5 to 25% of the thiophosphates. These formulations will contain from 55 to 97%, and preferably from 70 to 95% of the solid inerts, from 0.05 to 10% by weight and preferably 0.1 to 5% of the alcohol or ether component of the thiophosphate stabilizer and 0.05 to 5%, and preferably 0.1 to 3%, of the ester component.

Both the dust formulations and the wettable types are prepared by intimately mixing the components in any device conventionally used in mixing pulverulent compositions. To aid in the uniform mixing, finely divided components are favored and the organic components soluble in the stabilizer components. Improved mixing may be obtained by the addition of a liquid hydrocarbon solvent for the thiophosphate esters which will also be a solvent for one or more of the other components. Xylene, benzene, toluene, cyclohexane, n-hexane pentanes, and other higher or lower boiling hydrocarbons may be used for this purpose.

While this invention has been described with respect to certain embodiments, it is not so limited and it is to be understood that variations and modifications thereof obvious to those skilled in the art may be made without departing from the spirit or scope of this invention.

This application is a continuation-in-part of copending application Serial Number 800,913, filed March 23, 1959, now abandoned.

The embodiments of the invention in which an exclusive property or privilege is claimed are defined as follows:

1. A heat stabilized insecticidal composition comprising 55 to 97% by weight of inert pulverulent solid particles, from 2 to 40% by weight of a phosphorothioate of the group consisting of O,O-dimethyl O-p-nitrophenyl phosphorothioate, O,O-diethyl O-p-nitrophenyl phosphorothioate and S-[1,2-bis(ethoxycarbonylethyl)]-O,O-dimethylphosphorodithioate, from 0.05 to 10% by weight of an alcohol selected from the group consisting of alkyl alcohol having from 4 to 18 carbon atoms, cyclopentanol and cyclohexanol; and from 0.05 to 10% by weight of dialkyl sulfate, wherein the alkyl radical has up to 18 carbon atoms.

2. A heat stabilized insecticidal composition comprising from 70 to 95% by weight of inert pulverulent solid particles, from 5 to 25% by weight of O,O-dimethyl O-p-nitrophenyl phosphorothioate, from 0.1 to 5.0% by weight of isodecyl alcohol and from 0.1 to 5.0 percent by weight of diethyl sulfate.

3. A heat stabilized insecticidal composition comprising 70 to 95% by weight of inert pulverulent solid particles, from 5 to 25% by weight of O,O-dimethyl O-p-nitrophenyl phosphorothioate, from 0.1 to 5.0% by weight of cyclohexyl alcohol and from 0.1 to 5.0% by weight of diethyl sulfate.

4. A heat stabilized insecticidal composition comprising from 70 to 95% by weight of inert pulverulent solid particles, from 5 to 25% by weight of O,O-diethyl O-p-nitrophenyl phosphorothioate, from 0.1 to 5.0% by weight of isodecyl alcohol and from 0.1 to 5.0% by weight of diethyl sulfate.

5. A heat stabilized insecticidal composition comprising 70 to 95% by weight of inert pulverulent solid particles, from 5 to 25% by weight of O,O-diethyl O-p-nitrophenyl phosphorothioate, from 0.1 to 5.0% by weight of cyclohexyl alcohol and from 0.1 to 5.0 percent by weight of diethyl sulfate.

6. A heat stabilized insecticidal composition comprising from 70 to 95% by weight of inert pulverulent solid particles, from 5 to 25% by weight of S-[1,2-bis(ethoxycarbonylethyl)] - O,O-dimethylphosphorodithioate, from 0.1 to 5.0% by weight of isodecyl alcohol and from 0.1 to 5.0% by weight of diethyl sulfate.

7. A heat stabilized insecticidal composition comprising 70 to 95% by weight of inert pulverulent solid particles, from 5 to 25% by weight of S-[1,2-bis(ethoxycarbonylethyl)]-O,O-dimethylphosphorodithioate, from 0.1 to 5.0% by weight of cyclohexyl alcohol and from 0.1 to 5.0 percent by weight of diethyl sulfate.

References Cited in the file of this patent

UNITED STATES PATENTS

| | | |
|---|---|---|
| 2,276,315 | Kirk | Mar. 17, 1942 |
| 2,770,567 | Wedemeyer | Nov. 13, 1956 |
| 2,927,882 | Trademan | Mar. 8, 1960 |
| 2,967,127 | Sawyer | Jan. 3, 1961 |